United States Patent
Yoshimoto

(10) Patent No.: US 10,518,709 B2
(45) Date of Patent: Dec. 31, 2019

(54) VEHICLE REAR STRUCTURE

(71) Applicant: TOYOTA JIDOSHA KABUSHIKI KAISHA, Toyota-shi, Aichi-ken (JP)

(72) Inventor: Masaki Yoshimoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/992,660

(22) Filed: May 30, 2018

(65) Prior Publication Data

US 2018/0345880 A1  Dec. 6, 2018

(30) Foreign Application Priority Data

Jun. 6, 2017 (JP) ................... 2017-111776

(51) Int. Cl.
*B60R 13/02* (2006.01)
*B60R 5/04* (2006.01)

(52) U.S. Cl.
CPC .......... *B60R 5/044* (2013.01); *B60R 13/0237* (2013.01); *B60R 13/0268* (2013.01); *B60R 2013/0287* (2013.01)

(58) Field of Classification Search
CPC . B60R 5/044; B60R 13/0237; B60R 13/0268; B60R 2103/0287
USPC ............................................. 296/24.4–24.45
See application file for complete search history.

(56) References Cited

U.S. PATENT DOCUMENTS

| 7,556,302 B2 * | 7/2009 | Sakai | B60R 5/044 |
| | | | 181/150 |
| 2016/0236627 A1 * | 8/2016 | Kato | B60R 11/0217 |

FOREIGN PATENT DOCUMENTS

| DE | 3229983 | * | 1/1984 | ......... B60N 2/4238 |
| GB | 2379419 A | * | 3/2003 | ......... B60R 5/044 |
| GB | 2398051 A | * | 8/2004 | ......... B60N 3/004 |
| JP | 2016-147632 A | | 8/2016 | |

* cited by examiner

*Primary Examiner* — Dennis H Pedder
(74) *Attorney, Agent, or Firm* — Oliff PLC

(57) ABSTRACT

A vehicle rear structure, comprising a fixation wall which is erected behind a rear seat, and an upper back panel whose end is attached to the fixation wall, wherein the upper back panel is provided with a first attaching portion which is attached to the fixation wall and extends in a direction substantially parallel to the fixation wall, and a folding portion which is connected to an upper end of the first attaching portion, opposed to the first attaching portion in a vehicle longitudinal direction, and when a force is applied in the forward direction of the vehicle, is folded with its upper end as a fulcrum toward the front of the vehicle; and the folding portion has a length to contact the first attaching portion or the fixation wall at a position below an upper end of the fixation wall when it is folded.

6 Claims, 6 Drawing Sheets

VEHICLE REAR STRUCTURE

CROSS REFERENCE TO RELATED APPLICATION

The disclosure of Japanese Patent Application No. 2017-111776 filed on Jun. 6, 2017 including the specification, claims, drawings, and abstract is incorporated herein by reference in its entirety.

TECHNICAL FIELD

This application discloses a vehicle rear structure which has a fixation wall erected behind a rear seat, and an upper back panel whose end is attached to the fixation wall.

BACKGROUND

Generally, a rear seat backrest is provided with a fixation wall fixed to the rear seat, and an upper back panel attached to the fixation wall. The upper back panel is a panel dividing a cabin and a luggage space and extending substantially horizontally.

Patent Document 1 describes a bead which is formed at the center in the width direction of the upper back panel and extended in a vehicle longitudinal direction to suppress a vertical vibration of the upper back panel. According to its technology, the vertical vibration of the upper back panel in the vehicle can be suppressed effectively.

CITATION LIST

Patent Literature

Patent Document 1: JP 2016-147632 A

The upper back panel may be subjected to a force in the forward direction of the vehicle in addition to the vertical vibration in the vehicle. The vehicle is generally provided with seat belts (such as rear seat belts and a tether strap for a child seat) for restraining occupants, and the upper back panel is fixed with connecting members to which the seat belts are connected. The connecting members correspond to retractors for taking up the rear seat belts and an anchor with which the tether strap is engaged.

When the vehicle decelerates or stops suddenly, an occupant seated in the rear seat is moved forward by an inertial force. Since the occupant moves forward, a force in the forward direction of the vehicle is applied to an occupant restraining belt, the connecting member to which the belt is connected, and the upper back panel with which the connecting member is fixed. Patent Document 1 has no description on a countermeasure when the force applied in the forward direction of the vehicle is large, and there still remains room for improvement.

Therefore, the present application discloses a vehicle rear structure which can suppress movement of the upper back panel in the forward direction even when the upper back panel receives the force applied in the forward direction of the vehicle.

SUMMARY

The vehicle rear structure disclosed in this application has a fixation wall which is erected behind a rear seat, and an upper back panel whose end is attached to the fixation wall, wherein the upper back panel is provided with a first attaching portion which is attached to the fixation wall and extends in a direction substantially parallel to the fixation wall, and a folding portion which is connected directly or indirectly to an upper end of the first attaching portion, opposed to the first attaching portion in a vehicle longitudinal direction, and which, when a force is applied in the forward direction of the vehicle, is folded with its upper end as a fulcrum toward the front of the vehicle; and the folding portion has a length to contact the first attaching portion or the fixation wall at a position below an upper end of the fixation wall when it is folded.

By such a structure, when the folding portion receives the force applied in the forward direction of the vehicle, the force in the forward direction of the vehicle is received by the fixation wall. As a result, the fixation between the fixation wall and the first attaching portion is not released easily, and forward movement of the upper back panel is effectively prevented.

The folding portion is an inclined portion which is inclined downwardly in the vehicle as it advances toward the rear of the vehicle, and a length from the upper to lower ends of the folding portion may be equal to or larger than the distance from its upper end to the upper end of the fixation wall.

By such a structure, when the folding portion receives the force applied in the forward direction of the vehicle, the vehicle forward force can be surely received by the fixation wall.

In addition, a rear skeleton to which the rear end of the upper back panel is attached is provided, and the upper back panel may be provided with a second attaching portion which is attached to the rear skeleton, and an extension portion which is provided between the folding portion and the second attaching portion, and when receiving a force pulling in the forward direction of the vehicle, the extension portion is extended in the vehicle longitudinal direction.

By providing the extension portion, at least part of the contraction amount of the upper back panel due to folding of the folding portion can be cancelled by the extension amount of the upper back panel due to extension of the extension portion, and an amount of forward movement of the second attaching portion can be reduced.

In this case, the extension amount of the upper back panel in the vehicle longitudinal direction caused when the extension portion is extended is desirably larger than the contraction amount of the upper back panel in the vehicle longitudinal direction caused when the folding portion is folded.

By such a structure, the contraction amount of the upper back panel due to folding of the folding portion can be offset completely by the extension amount of the upper back panel due to extension of the extension portion, and forward movement of the second attaching portion can be prevented.

In addition, the extension portion may also be an inclined portion which changes its height in the vehicle vertical direction as it advances toward the rear of the vehicle.

In this case, the extension portion has a simple shape and can be shaped easily.

When it is assumed that a length of the folding portion is L2, a length of the extension portion is L3, an angle of the folding portion to the horizontal face is $\alpha$ before folding and $\gamma$ after folding, and an angle of the extension portion to the horizontal face is $\beta$ before extension, the relation $L2\times(\cos\alpha+\cos\gamma)\leq L3\times(1-\cos\beta)$ is satisfied.

By such a structure, the contraction amount of the upper back panel due to folding of the folding portion can be offset completely by the extension amount of the upper back panel due to extension of the extension portion, and forward movement of the second attaching portion can be prevented.

In addition, there is provided a connecting member to which a belt for holding an occupant or a child seat in the rear seat is connected and which is fixed to the upper back panel, wherein the connecting member is fixed to the upper back panel at a position behind the folding portion in the vehicle and in front of the extension portion in the vehicle.

By such a structure, when the connecting member is pulled forward, a force to push the rear end of the folding portion toward the front of the vehicle and a force to pull the front end of the extension portion toward the front of the vehicle are generated, and folding of the folding portion and extension of the extension portion are surely performed.

According to the vehicle rear structure described in this specification, a force applied to the folding portion toward the front of the vehicle can be received by the fixation wall. As a result, the fixation of the fixation wall and the first attaching portion is not released easily, and the forward movement of the upper back panel is prevented effectively.

BRIEF DESCRIPTION OF DRAWINGS

Embodiment(s) of the present disclosure will be described by reference to the following figures, wherein.

DESCRIPTION OF EMBODIMENTS

Figure 1:
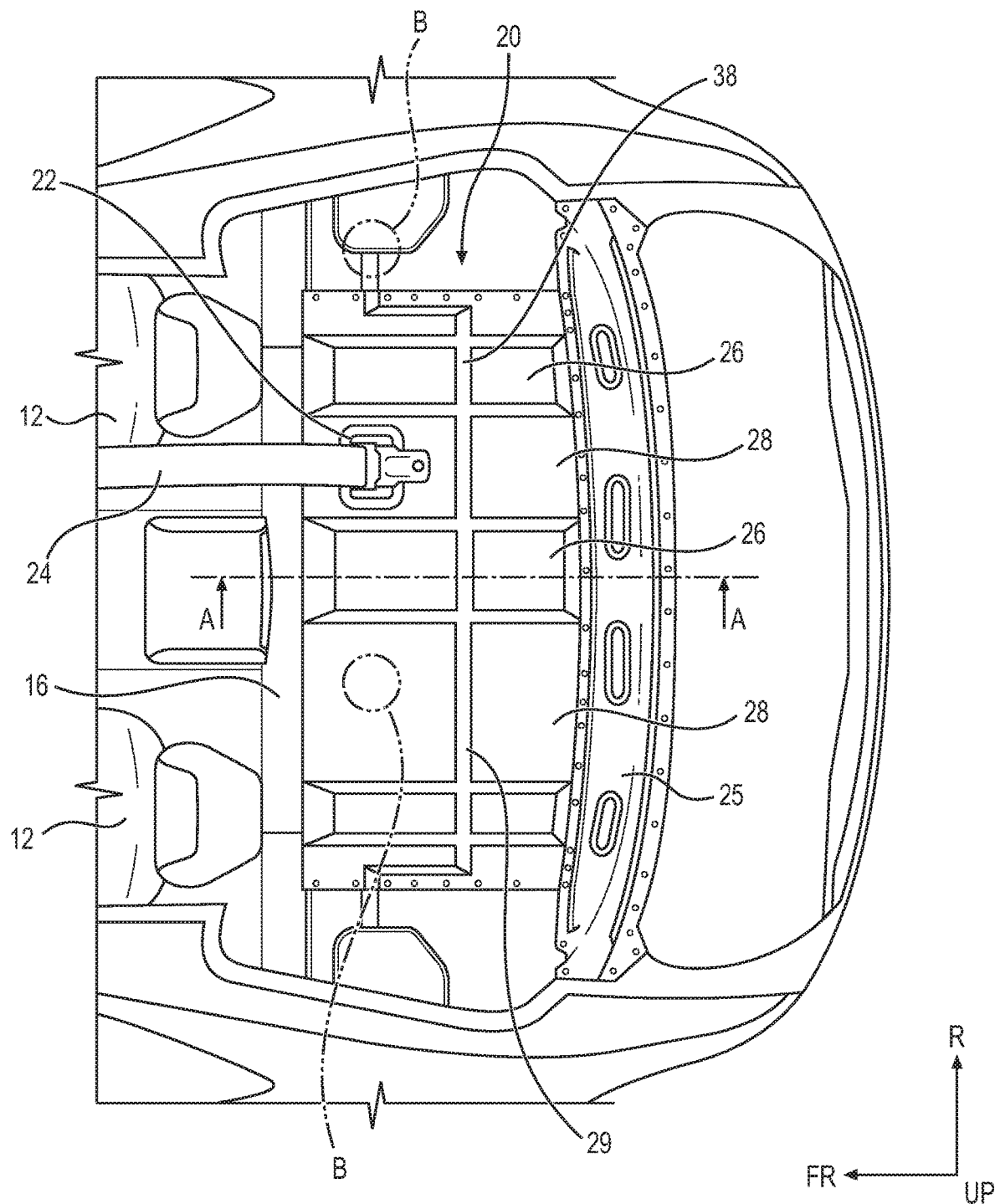
FIG. 1 is a schematic plan view of a vehicle rear structure.
Figure 2:
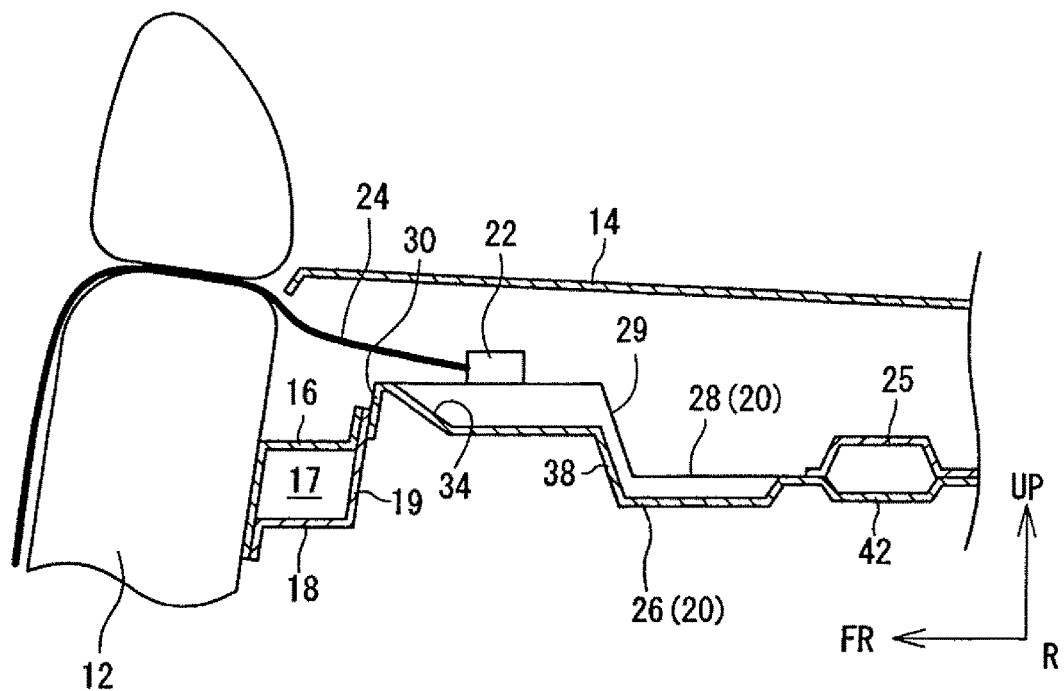
FIG. 2 is a schematic sectional view taken along a line A-A of FIG. 1.

A vehicle rear structure will be explained with reference to drawings. FIG. 1 is a schematic plan view of the vehicle rear structure, and FIG. 2 is a schematic sectional view taken along a line A-A of FIG. 1. An upper back panel 20 to be described later is normally concealed by being covered with a cover 14, but FIG. 1 shows the upper back panel 20 without showing a vehicle roof and the cover 14.

A rear seat 12 is provided in a rear portion of the vehicle, and an upper back outer 16, an upper back inner 18 (not shown in FIG. 1) and the upper back panel 20 are provided behind the rear seat 12. The cover 14 (FIG. 2) is disposed to cover these three members 16, 18 and 20, so that these three members 16, 18 and 20 are normally invisible to occupants.

As shown in FIG. 2, each of the upper back outer 16 and the upper back inner 18 is made of a thin plate member having a step-shaped cross section formed by bending two times. The upper back outer 16 and the upper back inner 18 are long in the vehicle width direction and mutually opposed and fixed to form a channel 17 having an approximately rectangular cross section. Here, the "fixing" means mutual adhesion of the two members so as not to be separated easily. Therefore, the fixing also includes attaching with adhesive tape, screws, or the like in addition to attaching by spot welding or welding. The following description will explain an example in which individual members are fixed by spot welding.

The upper back outer 16 is fixed to the rear surface of the rear seat 12 directly or via another member. In addition, the upper back inner 18 is fixed to the upper back outer 16, and the rear end face of the upper back inner 18 functions as a fixation wall 19 erected behind the rear seat 12.

The upper back panel 20 is fixed (for example, spot-welded) to the rear end face of the upper back inner 18, namely, the fixation wall 19. The upper back panel 20 is a panel member extending horizontally (a vehicle longitudinal direction and a vehicle width direction) to divide the cabin and the cargo room.

A retractor 22 is fixed to the upper surface of the upper back panel 20. The retractor 22 is a member for taking up a rear seat belt 24 for restraining an occupant in the rear seat 12 and functions as a connecting member for connecting the rear seat belt 24 and the upper back panel 20. FIG. 1 shows only one retractor 22, but the retractor 22 may be disposed in plural numbers. For example, the retractor 22 may be disposed at part B in FIG. 1. In addition to the retractor 22, an anchor for locking the tether strap for the child seat may also be disposed as a connecting member.

As shown in FIG. 1, the upper back panel 20 is formed with a plurality of groove portions 26 extending in the vehicle longitudinal direction at intervals in the vehicle width direction. These groove portions 26 are formed avoiding the connecting members (the retractor 22 or the anchor). Portions other than the groove portions 26 on the upper back panel 20 are called reference portions 28. Accordingly, the upper back panel 20 has the reference portions 28 where the retractor 22 or the like is disposed, and the groove portions 26 lower than the reference portions 28 which are alternately disposed in the vehicle width direction. Thus, the plural groove portions 26 are provided on the upper back panel 20 to enhance the strength of the upper back panel 20 and to suppress vibration in the vehicle vertical direction.

Figure 3:
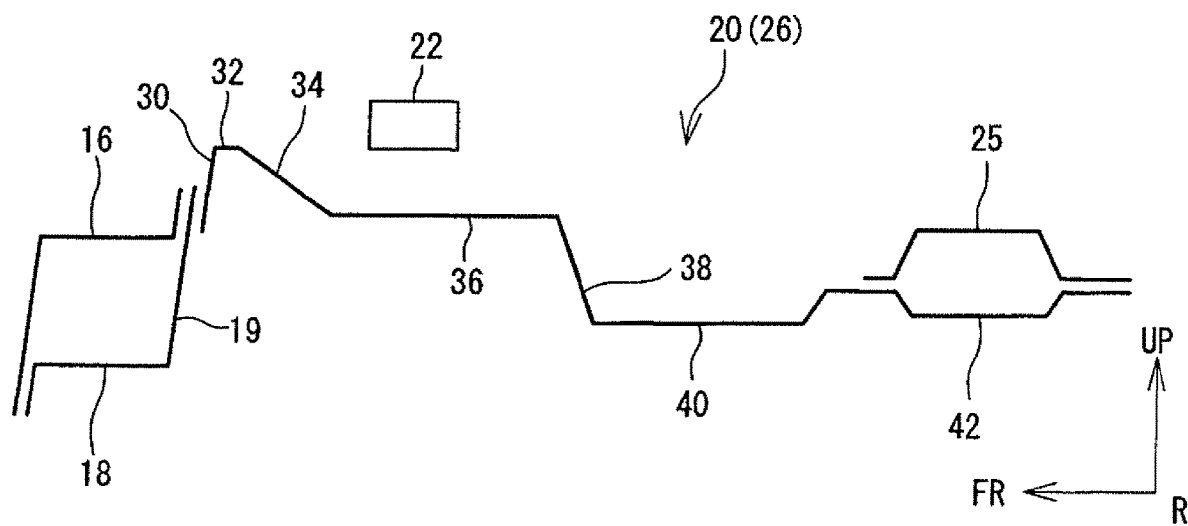
FIG. 3 is a schematic view showing a cross sectional shape of a groove portion of an upper back panel.
Figure 4:
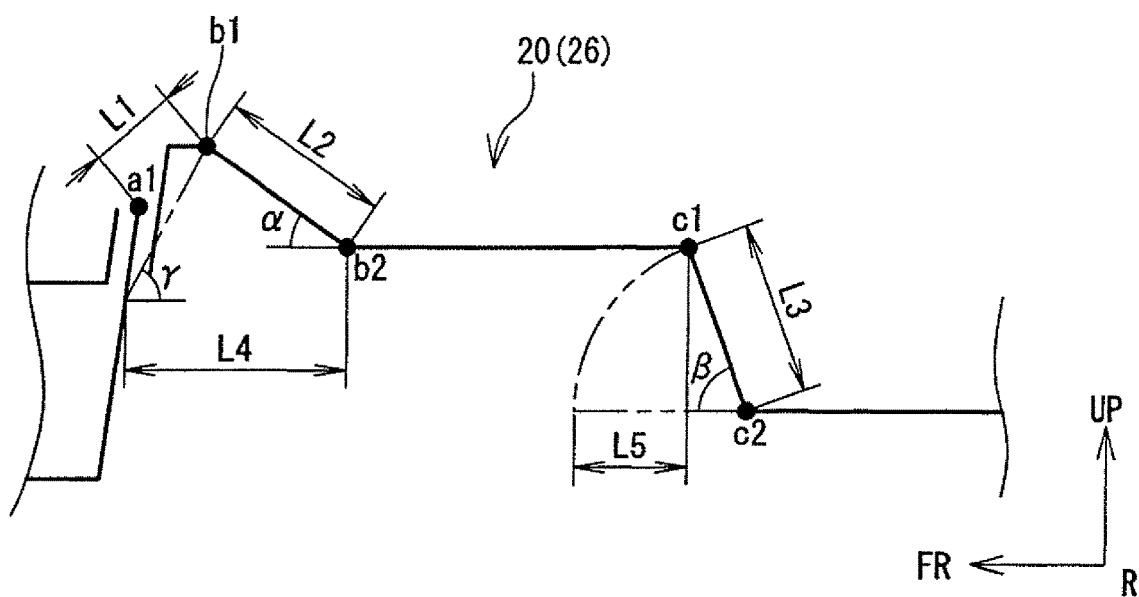
FIG. 4 is a diagram illustrating the dimensions of respective portions.

FIG. 3 is a schematic view showing a cross sectional shape of the groove portion 26, and FIG. 4 is a diagram illustrating dimensions of the groove portion 26. FIG. 3 shows that the groove portion 26 is bent multiple times in the vehicle longitudinal direction. More specifically, the groove portion 26 is largely divided into a group of a first attaching portion 30, an intermediate portion 32 and a folding portion 34, and a group of a first main surface portion 36, an extension portion 38, a second main surface portion 40 and a second attaching portion 42 in order from the vehicle front side. The first attaching portion 30 is a part fixed to the rear end face (the fixation wall 19) of the upper back inner 18 and extended in a direction substantially parallel to the fixation wall 19. As shown in FIG. 3, the upper end of the first attaching portion 30 protrudes upward higher than the upper end of the fixation wall 19.

The intermediate portion 32 extending to the rear of the vehicle extends from the upper end of the first attaching portion 30. The intermediate portion 32 is located at the same height as the reference portion 28 where the retractor 22 or the like is disposed. The folding portion 34, which is opposed to the first attaching portion 30 in the vehicle longitudinal direction, extends from the rear end of the intermediate portion 32. The folding portion 34 has an inclined plane extending downward of the vehicle as it advances toward the rear of the vehicle. When this folding portion 34 receives a force toward the front of the vehicle as described in detail later, it is folded with its upper end b1 (see FIG. 4) as a fulcrum toward the front of the vehicle. In addition, when the folding portion 34 is folded, it is contacted to the first attaching portion 30 or the fixation wall 19 at a position below an upper end a1 of the fixation wall 19. Specifically, a length L2 from the upper end b1 to a lower end b2 of the folding portion 34 is not smaller than a distance L1 from the upper end hi of the folding portion 34 to the upper end a1 of the fixation wall 19. A reason for having the above structure will be described later.

The first main surface portion 36 extends substantially horizontally from the rear end (lower end b2) of the folding portion 34. The extension portion 38 also extends from the rear end of the first main surface portion 36. When the extension portion 38 receives a force pulling toward the front of the vehicle, it extends in the vehicle longitudinal direction. The extension portion 38 has an inclined plane extending downward of the vehicle as it advances toward the rear of the vehicle as shown in FIG. 3. A reason for disposing the extension portion 38 will be described later.

The second main surface portion 40 extends substantially horizontally from a rear end (rear end c2) of the extension portion 38, and the second attaching portion 42 extends from the rear end of the second main surface portion 40. The second attaching portion 42 extends horizontally and its upper surface is fixed to the bottom surface of an upper back reinforcement (hereinafter referred to as "upper back R/F") 25. The upper back R/F 25 is a rear skeleton member disposed at a vehicle rear part.

The reference portion 28 has less surface unevenness compared with the groove portion 26, but an inclined plane 29 which is continued to the extension portion 38 is formed substantially at the center of the reference portion 28 in the vehicle longitudinal direction. At the vehicle rear side from the inclined plane 29, the reference portion 28 has substantially the same height as the second attaching portion 42, and the rear end of the reference portion 28 is fixed to the upper back R/F 25. As is apparent from FIG. 2 and FIG. 3, the retractor 22 is fixed to the reference portion 28 on the rear side from the folding portion 34 in the vehicle and on the front side from the extension portion 38 in the vehicle.

Figure 9:
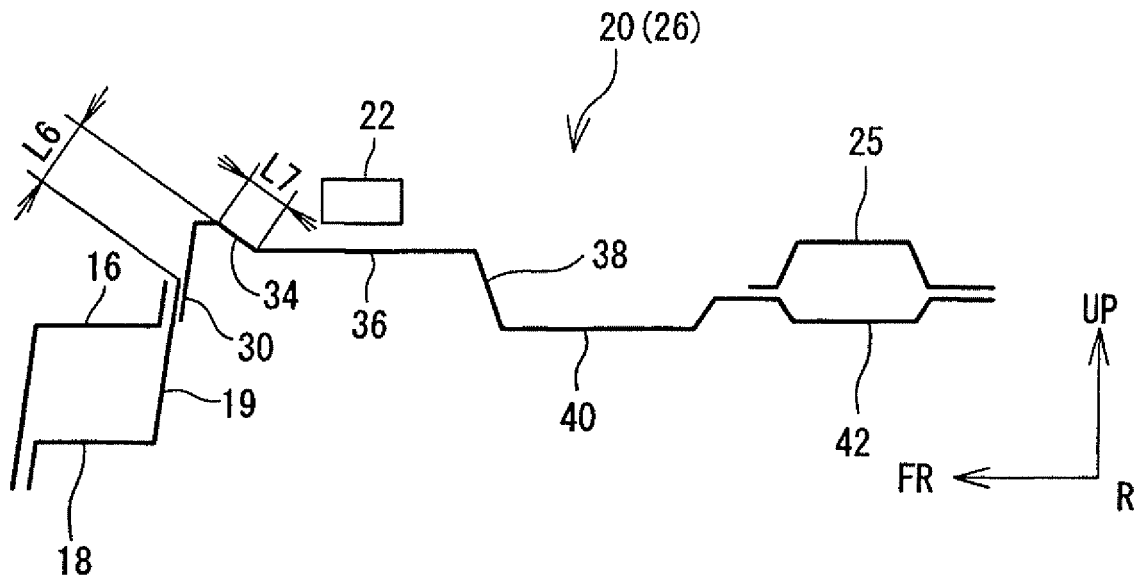
FIG. 9 is a schematic view showing a cross sectional shape of a groove portion of a comparative example.

As apparent from the above description, the upper back panel 20 described in this specification has the folding portion 34. This folding portion 34 has a length to contact the first attaching portion 30 or the fixation wall 19 at a position below the upper end a1 of the fixation wall 19 when it is folded. A reason of having such a configuration is explained with reference to a comparative example. FIG. 9 is a schematic view showing a cross sectional shape of the upper back panel 20 of the comparative example. In the comparative example, a distance L6 from the upper end of the folding portion 34 to the upper end of the fixation wall 19 is larger than a length L7 from upper to lower ends of the folding portion 34.

It is assumed that a vehicle with the above configuration decelerates or stops suddenly. Then, an occupant in the rear seat 12 is moved toward the front of the vehicle by an inertial force. When the occupant is moved forward, it is natural that a force toward the front of the vehicle is also applied to the rear seat belt 24 for holding the occupant, the retractor 22 to which the rear seat belt 24 is connected, and the upper back panel 20.

Here, the retractor 22 is positioned on the vehicle rear side from the folding portion 34 and the vehicle front side from the extension portion 38. Therefore, when the retractor 22 is pulled toward the front of the vehicle, the rear end of the folding portion 34 is pushed toward the front of the vehicle, and the front end of the extension portion 38 is pulled toward the front of the vehicle. The rear end of the folding portion 34 is pushed toward the front of the vehicle, the folding portion 34 is folded with its upper end as a fulcrum, and the rear end of the folding portion 34 comes into contact with the opposed first attaching portion 30. Here, the contact position is higher than the upper end of the fixation wall 19, so that the force forwardly pushing the folding portion 34 cannot be received by the fixation wall 19 but can be received by the first attaching portion 30 only.

Figure 10:
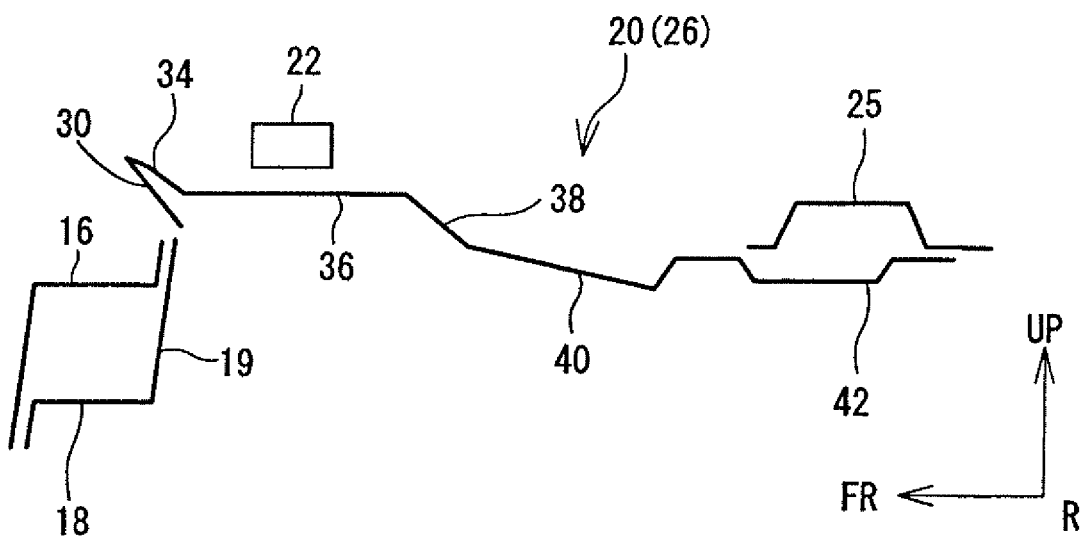
FIG. 10 is a schematic view showing a cross sectional shape of the groove portion after transformation of the comparative example.

When a forward force is applied to the first attaching portion 30, the fixed portion (for example, a welded portion) between the first attaching portion 30 and the fixation wall 19 is broken, the first attaching portion 30 and the fixation wall 19 are separated from each other as shown in FIG. 10, and the entire upper back panel 20 is sometimes moved to the vehicle front side. Naturally, the retractor 22 and the rear seat belt 24 are also moved to the vehicle front side, and the occupant-holding property of the rear seat belt 24 is deteriorated. Moreover, when the upper back panel 20 is moved to the vehicle front side, the second attaching portion 42 is moved forward more than the upper back R/F 25, and their fixing is sometimes released.

Figure 5:
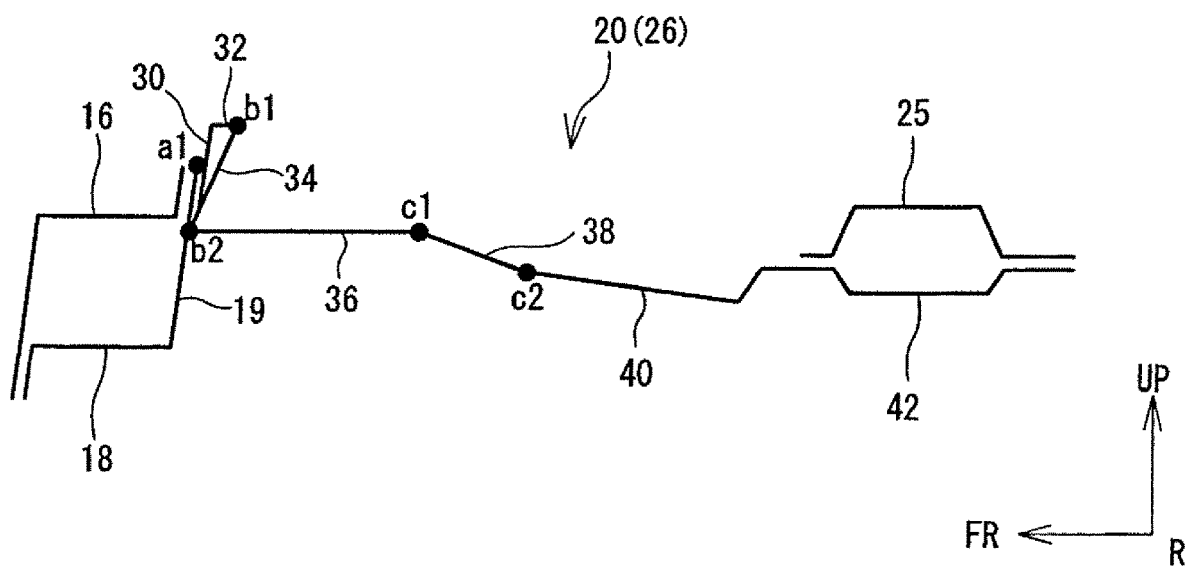
FIG. 5 is a schematic view showing a cross sectional shape of a transformed groove portion.

Meanwhile, on the upper back panel 20 described in this specification, the length L2 from the upper end b1 to the lower end b2 of the folding portion 34 is larger than the distance L1 from the upper end b1 of the folding portion 34 to the upper end a1 of the fixation wall 19 as described above. Here, it is assumed that the rear end (lower end b2) of the folding portion 34 is pushed toward the front of the vehicle, and the folding portion 34 is folded with its upper end b1 as a fulcrum. In this case, the rear end (lower end b2) of the folding portion 34 is contacted to the fixation wall 19 or the first attaching portion 30 at a position below the upper end a1 of the fixation wall 19 as shown in FIG. 5. The force pushing the folding portion 34 forward is received by the fixation wall 19, so that fixing between the first attaching portion 30 and the fixation wall 19 is not released. As a result, the upper back panel 20 and the retractor 22 are effectively prevented from moving to the vehicle front side, and degradation of the occupant-holding property the rear seat belt 24 is effectively prevented.

In a case where the retractor 22 is pulled toward the front of the vehicle, the extension portion 38 positioned behind the retractor 22 is pulled its front end c1 toward the front of the vehicle. When the front end c1 is pulled forward, the extension portion 38 falls with its rear end c2 as a fulcrum to extend as shown in FIG. 5. Thus, the upper back panel 20 extends in the vehicle longitudinal direction.

In other words, when the retractor 22 is pulled toward the front of the vehicle, the groove portion 26 of the upper back panel 20 contracts in the vehicle longitudinal direction when the folding portion 34 is folded, but the groove portion 26 extends in the vehicle longitudinal direction as the extension portion 38 extends. In other words, provision of the extension portion 38 allows reduction in the contraction amount in the vehicle longitudinal direction of the upper back panel 20 when the retractor 22 is pulled toward the front of the vehicle. As a result, a movement amount in the forward direction of the vehicle with respect to the upper back R/F 25 of the second attaching portion 42 can be reduced, and their fixation release can be suppressed effectively.

Next, dimensions of the folding portion 34 and the extension portion 38 are described. As described above, the length L2 from the upper end b1 to the lower end b2 of the folding portion 34 must be larger than the distance L1 between the upper end b1 and the upper end a1 of the fixation wall 19. Moreover, when an angle α between the folding portion 34 before folding and the horizontal plane is excessively small (the folding portion 34 becomes close to horizontal), the folding portion 34 becomes hardly foldable. When the angle α is excessively small, a movement amount of the lower end b2 before the folding portion 34 is completely folded becomes large, a transformed amount (a locally transformed amount) of the groove portion 26 of the upper back panel 20 becomes large, and a large stress is easily generated. Therefore, the angle α has a value desirably large to some extent, for example, α≥20°.

After folding, if an angle γ formed between the folding portion 34 and the horizontal plane is excessively small, the movement amount of the lower end b2 before folding becomes large, and a large stress is generated easily. Therefore, it is desired that the angle γ is also a value large to some extent, for example, γ≥17°.

When the extension portion 38 can be pulled toward the front of the vehicle and extended in the vehicle longitudinal direction, no particular limitation is imposed on its length and angle. However, to prevent the second attaching portion 42 from being pulled in the forward direction, it is desired that an extension amount L5 of the upper back panel 20 in the vehicle longitudinal direction caused when the extension portion 38 is extended is larger than a contraction amount L4 of the upper back panel 20 in the vehicle longitudinal direction caused when the folding portion 34 is folded. This condition is satisfied by satisfying the following expression 1 when the folding portion 34 has an inclined plane.

[Math. 1]

$$L2 \cdot (\cos \alpha + \cos \gamma) \leq L3 \cdot (1 - \cos \beta) \quad (1)$$

In expression 1, β is an angle formed by the extension portion 38 before extension and the horizontal plane, and L3 indicates the length from the front end c1 to the rear end c2 of the extension portion 38. In expression 1, the left side shows the amount L4 that the lower end b2 advances when the folding portion 34 is folded, and the right side shows the amount L5 that the front end c1 advances when the extension portion 38 is extended. Considering the extendibility and formability of the extension portion 38 in addition to the expression 1, the angle β is desirably β≥80°. All of the above dimensions and others of the extension portion 38 were used as one example and may be modified appropriately. Therefore, for example, the left side of the expression 1 may be larger than the right side (that is, the inequality sign in the expression 1 may be reversed). Even in such a case, the movement amount of the second attaching portion 42 can be reduced in comparison with a case that the extension portion 38 is not provided. FIG. 1 to FIG. 5 show examples where L4>L5 and the inequality sign in the expression 1 is reversed.

Figure 6:
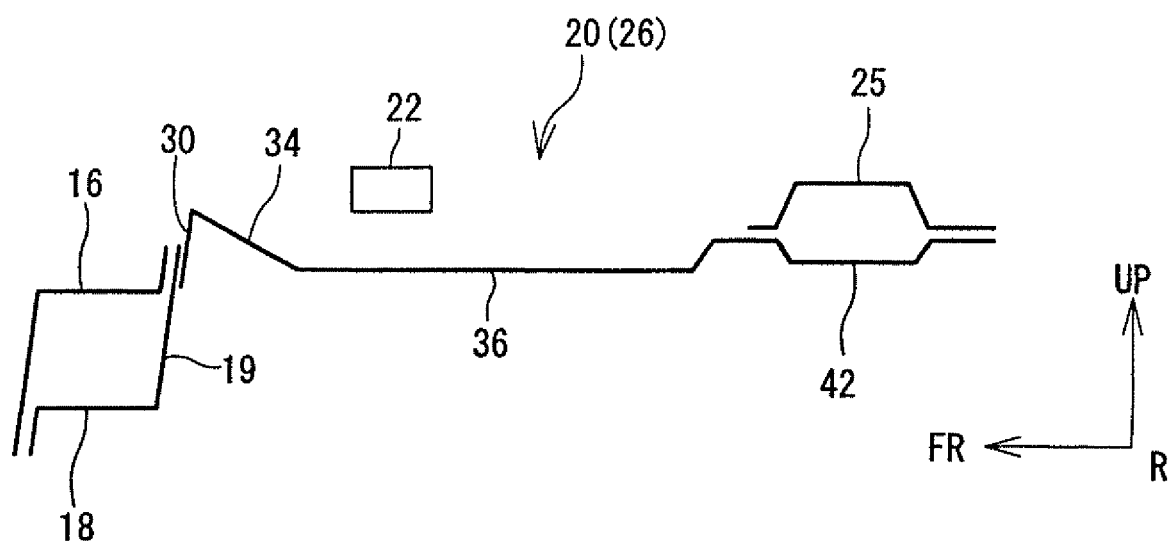
FIG. 6 is a schematic view showing a cross sectional shape of another groove portion.

The above-described configuration is one example. Therefore, it should be understood that when the upper back panel 20 is provided with the folding portion 34, which is folded with its upper end b1 as a fulcrum toward the front of the vehicle if a force is applied in the forward direction of the vehicle, and the folding portion 34 has a sufficient length to come into contact with the first attaching portion 30 or the fixation wall 19 at a position below the upper end of the fixation wall 19 when the folding portion 34 is folded, then the remaining configurations may be modified appropriately. For example, in the above description, the folding portion 34 is connected to the first attaching portion 30 via the intermediate portion 32, but the folding portion 34 may be connected directly to the first attaching portion 30 as shown in FIG. 6. In addition, no particular limitation is imposed on the fixation wall 19 to which the first attaching portion 30 is fixed and it may be any wall other than the upper back inner 18, so long as it is erected behind the rear seat 12.

Figure 7:
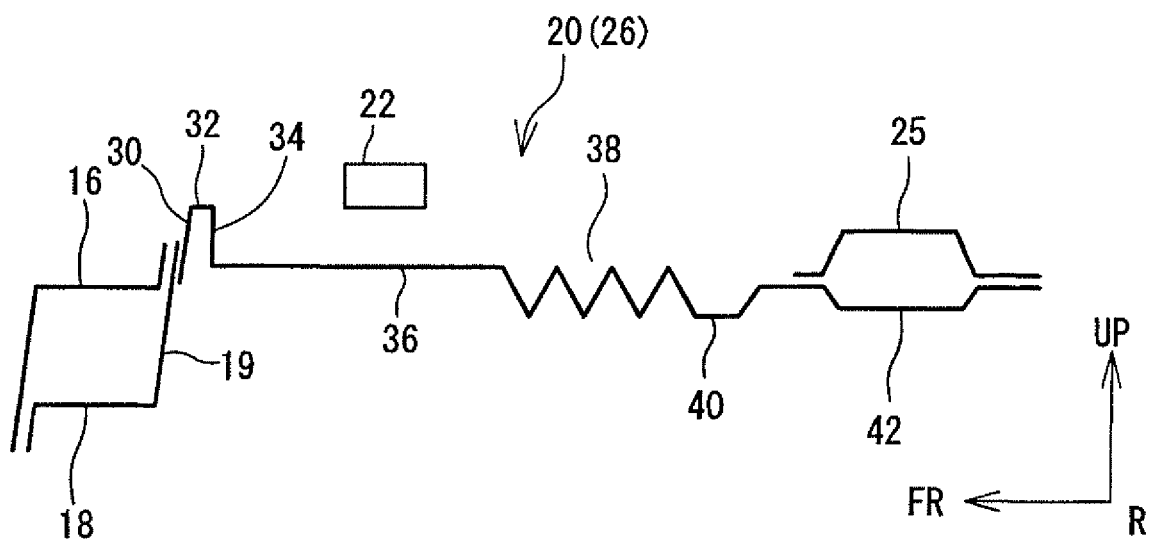
FIG. 7 is a schematic view showing a cross sectional shape of still another groove portion.
Figure 8:
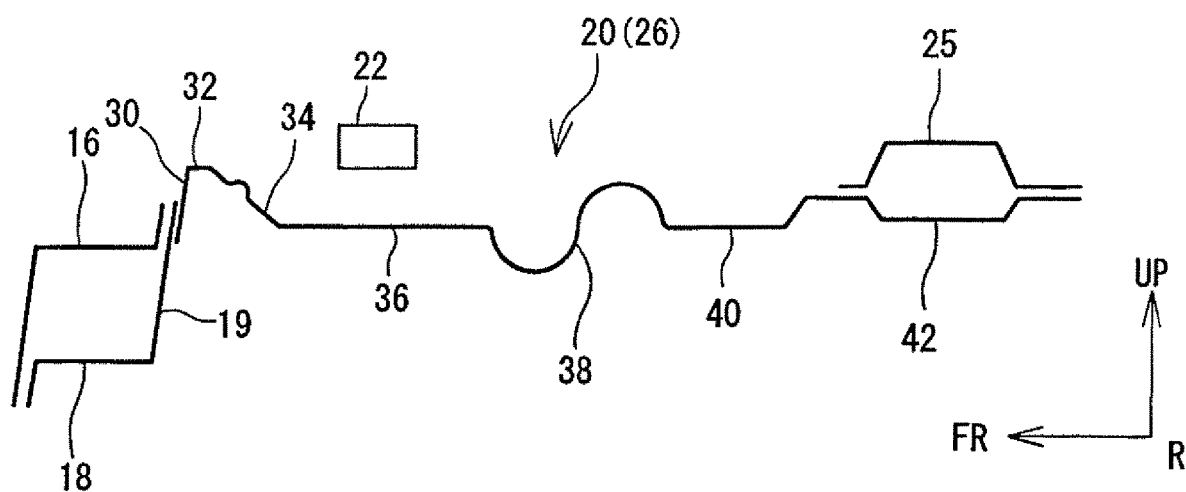
FIG. 8 is a schematic view showing a cross sectional shape of still another groove portion.

In the above description, the folding portion 34 has a shape with the inclined plane, but no particular limitation is imposed on its shape or the like so long as it is opposed to the first attaching portion 30 in the vehicle longitudinal direction. Therefore, the folding portion 34 may have an upright wall shape extending almost vertically as shown in FIG. 7, for example. In addition, the folding portion 34 may be curved or bent wholly or partly as shown in FIG. 8.

In the above description, the extension portion 38 is disposed between the folding portion 34 and the second attaching portion 42, but the extension portion 38 may be omitted as shown in FIG. 6. Moreover, the extension portion 38 does not necessarily have a single inclined plane but may have a saw-tooth shape with plural inclined planes linked as shown in FIG. 7. Thus, when the plural inclined planes are connected in this way, the extension amount when extended can be increased without greatly changing the height before and behind the extension portion 38. As another embodiment, the extension portion 38 may have a shape with arc surfaces connected in plural numbers as shown in FIG. 8.

The invention claimed is:

1. A vehicle rear structure comprising:
    a fixation wall erected behind a rear seat of a vehicle;
    an upper back panel having a forward end attached to the fixation wall, the upper back panel being separate from the fixation wall; and
    a rear skeleton attached to a rear end of the upper back panel, wherein the upper back panel includes:
        a first attaching portion that is attached to the fixation wall and extends in a direction substantially parallel to the fixation wall, the first attaching portion including the forward end attached to the fixation wall,
        a folding portion that is connected directly or indirectly to an upper end of the first attaching portion, the folding portion being opposed to the first attaching portion in a vehicle longitudinal direction, and when a force is applied in a forward direction of the vehicle, the folding portion is folded with an upper end as a fulcrum toward a front of the vehicle, the folding portion having a length to contact the first attaching portion or the fixation wall at a position below an upper end of the fixation wall when the folding portion is folded,
        a second attaching portion that is attached to the rear skeleton, and
        an extension portion that is disposed between the folding portion and the second attaching portion, and when receiving a force pulling in the forward direction of the vehicle, the extension portion extends in the vehicle longitudinal direction, the extension portion having an inclined plane extending in a downward direction of the vehicle as the extension portion advances toward a rear of the vehicle.

2. The vehicle rear structure according to claim 1, wherein:
    the folding portion is an inclined portion that is inclined downwardly in the vehicle as the folding portion advances toward the rear of the vehicle; and
    a length from the upper end to a lower end of the folding portion is equal to or larger than a distance from the upper end of the folding portion to the upper end of the fixation wall.

3. The vehicle rear structure according to claim 1, wherein:
- when the extension portion is extended, a extension length of the upper back panel is defined in the vehicle longitudinal direction,
- when the folding portion is folded, a contraction length of the upper back panel is defined in the vehicle longitudinal direction, and
- the extension length is larger than the contraction length.

4. The vehicle rear structure according to claim 1, wherein the extension portion is an inclined portion that changes a height of the extension portion in a vehicle vertical direction as the extension portion advances toward the rear of the vehicle.

5. The vehicle rear structure according to claim 4, wherein when a length of the folding portion is L2, a length of the extension portion is L3, an angle of the folding portion to a horizontal face is a before folding and γ after folding, and an angle of the extension portion to the horizontal face is β before extension, L2×(cos α+cos γ)≤L3×(1−cos β) is satisfied.

6. The vehicle rear structure according to claim 1, further comprising a connecting member to which a belt for holding an occupant or a child seat in the rear seat is connected, and the connecting member is fixed to the upper back panel, the connecting member being fixed to the upper back panel at a position behind the folding portion in the vehicle and in front of the extension portion in the vehicle.

\* \* \* \* \*